(12) United States Patent
Lim et al.

(10) Patent No.: US 10,558,870 B2
(45) Date of Patent: Feb. 11, 2020

(54) ELECTRONIC APPARATUS AND CONTROL METHOD THEREOF

(71) Applicant: SAMSUNG ELECTRONICS CO., LTD., Suwon-si (KR)

(72) Inventors: Tae-gyu Lim, Seoul (KR); Yeong-rok Lee, Suwon-si (KR); Hyun-seok Hong, Suwon-si (KR); Seung-hoon Han, Seoul (KR); Bo-seok Moon, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 94 days.

(21) Appl. No.: 15/806,983

(22) Filed: Nov. 8, 2017

(65) Prior Publication Data

US 2018/0129889 A1 May 10, 2018

Related U.S. Application Data

(60) Provisional application No. 62/419,645, filed on Nov. 9, 2016, provisional application No. 62/418,924, filed on Nov. 8, 2016.

(30) Foreign Application Priority Data

Nov. 8, 2017 (KR) .................. 10-2017-0148111

(51) Int. Cl.
*G06K 9/00* (2006.01)
*G06K 9/62* (2006.01)

(52) U.S. Cl.
CPC ..... *G06K 9/00805* (2013.01); *G06K 9/00744* (2013.01); *G06K 9/623* (2013.01)

(58) Field of Classification Search
CPC .. G06K 9/00744; G06K 9/00805; G06K 9/46; G06K 9/4671; G06K 9/4676;
(Continued)

(56) References Cited

U.S. PATENT DOCUMENTS

| 9,047,566 B2 | 6/2015 | Golovashkin et al. .. G06N 3/04 |
| 9,489,619 B2 | 11/2016 | Dull et al. ............... G06N 3/08 |

(Continued)

FOREIGN PATENT DOCUMENTS

| JP | 9-185595 A | 7/1997 | ............. G06F 15/18 |
| JP | 2016-99707 A | 5/2016 | ............... G06T 7/00 |

(Continued)

OTHER PUBLICATIONS

International Search Report (PCT/ISA/210) dated Jan. 23, 2018 by the International Searching Authority in International Patent Application No. PCT/KR2017/012616.
(Continued)

*Primary Examiner* — Andrew W Johns
(74) *Attorney, Agent, or Firm* — Sughrue Mion, PLLC

(57) ABSTRACT

An electronic apparatus and a control method thereof are provided. The control method includes: receiving video data; acquiring a plurality of feature information representing an object from the received video data using a plurality of filters; detecting the object included in the video data using feature information, among the plurality of feature information, acquired by at least two of the plurality of filters; and providing information on the detected object. As a result, the electronic apparatus can accurately detect surrounding vehicles and pedestrians even under a general road condition, dark road conditions (such as at night time and bad weather), or the like.

27 Claims, 12 Drawing Sheets

(58) Field of Classification Search
CPC .... G06K 9/6202; G06K 9/6228; G06K 9/623; G06K 9/629
See application file for complete search history.

(56) References Cited

U.S. PATENT DOCUMENTS

| | | | |
|---|---|---|---|
| 2006/0112028 A1 | 5/2006 | Xiao et al. | 706/15 |
| 2011/0131158 A1* | 6/2011 | Furukawa et al. | G06K 9/00993 706/12 |
| 2011/0135192 A1* | 6/2011 | Yokono | G06K 9/00369 382/160 |
| 2012/0218410 A1 | 8/2012 | Kim et al. | 348/148 |
| 2013/0250107 A1 | 9/2013 | Okada et al. | 348/148 |
| 2013/0282635 A1 | 10/2013 | Dull et al. | G06N 3/08 |
| 2015/0288948 A1 | 10/2015 | Schamp et al. | H04N 13/025 |
| 2015/0350572 A1 | 12/2015 | Hattori et al. | H04N 5/332 |
| 2015/0350607 A1 | 12/2015 | Kim et al. | H04N 7/181 |
| 2016/0096270 A1* | 4/2016 | Ibarz Gabardos et al. | B25J 9/163 700/253 |
| 2016/0247393 A1 | 8/2016 | Okamoto et al. | G08G 1/005 |
| 2018/0225125 A1* | 8/2018 | Okamoto et al. | G06K 9/00664 |

FOREIGN PATENT DOCUMENTS

| | | | | |
|---|---|---|---|---|
| JP | 6054005 B1 | 12/2016 | | G06N 3/04 |
| KR | 10-2008-0049473 A | 6/2008 | | G06T 7/00 |

OTHER PUBLICATIONS

Written Opinion (PCT/ISA/237) dated Jan. 23, 2018 by the International Searching Authority in Patent Application No. PCT/KR2017/012616.

Sean Bell et al., "Inside-Outside Net: Detecting Objects in Context with Skip Pooling and Recurrent Neural Networks", CVF, CVPR Paper, Computer Vision Foundation, (pp. 2874-2883, 10 Pages Total), Dec. 2015.

Shaoqing Ren et al., "Faster R-CNN: Towards Real-Time Object Detection with Region Proposal Networks", NIPS'15 Proceedings of the 28th International Conference on Neural Information Processing Systems, vol. 1, (9 Pages Total), Dec. 2015.

Joseph Redmon et al., "You Only Look Once: Unified, Real-Time Object Detection", CVF, CVPR Paper, Computer Vision Foundation, (pp. 779-788, 10 Pages Total), Jun. 8, 2015.

Zweng, Andreas et al., "Introducing Confidence Maps to Increase the Performace of Person Detectors", International Conference on Computer Analysis of Images and Patterns, Sep. 26, 2011, ISVC 2011, Part II, LNCS 6939, pp. 446-455, (10 pages total).

Bai, Kejia, "Adaptive Confidence Map Fusion in Visual Object Tracking", Information Engineering and Computer Science, 2009, ICIECS 2009, International Conference On, IEEE, Dec. 19, 2009, pp. 1-4, (4 pages total).

Communication dated Sep. 23, 2019 by the European patent Office in counterpart European Patent Application No. 17869574.8.

* cited by examiner

ELECTRONIC APPARATUS AND CONTROL METHOD THEREOF

CROSS-REFERENCE TO RELATED APPLICATIONS

This application claims the benefit of U.S. Provisional Application Nos. 62/419,645 and 62/418,924, filed respectively on Nov. 9, 2016 and Nov. 8, 2016 in the USPTO, and claims priority Korean Patent Application No. 10-2017-0148111, filed on Nov. 8, 2017 in the Korean Intellectual Property Office, the disclosures of which are incorporated herein by reference in their entireties.

BACKGROUND

Field

Apparatuses and methods consistent with one or more exemplary embodiments relate to an electronic apparatus and a control method thereof, and more particularly, to an electronic apparatus and a control method thereof capable of detecting an object from an input video data input to the electronic apparatus.

Description of the Related Art

With recent developments in self-driving technologies, electronic apparatuses, such as a head-up display mounted in a vehicle to provide driving information and a black box mounted in a vehicle to photograph driving situations and environments in real time, monitor a condition of a vehicle to provide monitored results. In addition, the electronic apparatus provides driving information including conditions of a road on which the vehicle is driving. Specifically, a related art electronic apparatus photographs the conditions of the road on which the vehicle is driving, detects objects including neighboring vehicles, pedestrians, and the like around the vehicle from the photographed video data, and provides driving information including at least one of type information, positional information, and movement information of the detected objects.

Accordingly, a driver may reduce the risk of accidents between vehicles or between vehicles and pedestrians by checking a distance from a preceding vehicle, a risk factor of a blind spot, whether there are pedestrians running across a road, and the like, based on various driving information provided through the electronic apparatus.

However, such a related art electronic apparatus has a problem that surrounding vehicles and pedestrians cannot be detected from the photographed video data under a road condition that the surrounding vehicles are parked or stopped around the vehicle or pedestrians running across a road on which vehicles are driving, a road condition of bad weather (snow, rain, fog), a road condition of night time, or the like.

SUMMARY

Aspects of one or more exemplary embodiments overcome the above disadvantages and other disadvantages not described above. Also, an exemplary embodiment is not required to overcome the disadvantages described above, and an exemplary embodiment may not overcome any of the problems described above.

Aspects of one or more exemplary embodiments allow for the easy detection of surrounding vehicles and pedestrians even under a general road condition, road conditions of night time and bad weather, or the like.

According to an aspect of an exemplary embodiment, there is provided a control method of an electronic apparatus, the control method including: receiving video data; acquiring a plurality of feature information representing an object from the received video data using a plurality of filters, respectively; detecting the object included in the received video data using feature information, among the plurality of feature information, acquired by at least two of the plurality of filters; and providing information on the detected object.

Each of the plurality of feature information may include a probability value representing a reliability of the object and positional information of the object.

The acquiring may include: acquiring, using a first filter of the plurality of filters, first feature information representing the object from the received video data; acquiring, using a second filter of the plurality of filters, second feature information representing the object from a first confidence map generated based on the first feature information; resizing a second confidence map generated based on the second feature information to a preset size; and acquiring, using a third filter of the plurality of filters, third feature information representing the object from the resized second confidence map.

The detecting may include: generating a plurality of confidence maps respectively corresponding to the plurality of filters using the plurality of feature information; acquiring a first confidence map and a second confidence map among the generated plurality of confidence maps; generating a final confidence map using the acquired first confidence map and the acquired second confidence map; and detecting the object by analyzing the final confidence map.

The first confidence map may be a map generated by using feature information acquired from a filter after a preset filter of the plurality of filters; and the second confidence map may be a map generated by using feature information acquired from a last filter of the plurality of filters.

The control method may further include adjusting a size of at least one of the first confidence map and the second confidence map so as to be a same size.

The detecting the object by analyzing the final confidence map may include detecting the object according to whether a probability value representing a reliability of the object is greater than or equal to a preset threshold value from the final confidence map.

The providing may include providing at least one of type information, positional information, and movement information of the detected object.

The electronic apparatus may communicate with another electronic apparatus provided in a transportation apparatus to provide driving information; and the providing the at least one of the type information, the positional information, and the movement information of the detected object may include using the at least one of the type information, the positional information, and the movement information of the detected object to provide at least one of distance information from the object, dangerous situation information, and blind spot notification information to the other electronic apparatus.

The electronic apparatus may be an apparatus included in a transportation apparatus, and the received video data may be video data for a front area or a rear area of a road on which the transportation apparatus is driving.

According to an aspect of another exemplary embodiment, there is provided an electronic apparatus, including:

an input configured to receive video data; an output configured to output information on an object included in the received video data; and at least one processor configured to acquire a plurality of feature information representing the object from the received video data using a plurality of filters, respectively, to detect the object included in the video data using feature information, among the plurality of feature information, acquired through at least two of the plurality of filters, and to control the output to output information on the detected object.

Each of the plurality of feature information may include a probability value representing a reliability of the object and positional information of the object.

The at least one processor may be further configured to: acquire, using a first filter of the plurality of filters, first feature information representing the object from the received video data; acquire, using a second filter of the plurality of filters, second feature information representing the object from a first confidence map generated based on the first feature information; resize a second confidence map generated based on the second feature information to a preset size; and acquire, using a third filter of the plurality of filters, third feature information representing the object from the resized second confidence map.

The at least one processor may be further configured to use the plurality of feature information acquired from the plurality of filters to respectively generate a plurality of confidence maps respectively corresponding to each of the plurality of filters; acquire a first confidence map and a second confidence map among the generated plurality of confidence maps; use the acquired first confidence map and the acquired second confidence map to generate a final confidence map; and analyze the final confidence map to detect the object.

The first confidence map may be a map generated by using feature information acquired from a filter after a preset filter among the plurality of filters; and the second confidence map may be a map generated by using feature information acquired from a last filter of the plurality of filters.

The at least one processor may be further configured to adjust a size of at least one of the first confidence map and the second confidence map so as to be a same size.

The at least one processor may be further configured to detect the object according to whether a probability value representing a reliability of the object is greater than or equal to a preset threshold value from the final confidence map.

The at least one processor may be further configured to control the output to output at least one of type information, positional information, and movement information of the detected object.

The electronic apparatus may further include: a communicator configured to communicate with another electronic apparatus to provide driving information, wherein the at least one processor may be further configured to control the communicator to transmit at least one of distance information from the object, dangerous situation information, and blind spot notification information to the other electronic apparatus using at least one of the type information, the positional information, and the movement information of the detected object.

The electronic apparatus may be included in a transportation apparatus, and the received video data may be video data for a front area or a rear area of a road on which the transportation apparatus is driving.

According to an aspect of another exemplary embodiment, there is provided a non-transitory computer-readable recording medium having recorded thereon a program executable by a computer for performing the control method.

According to an aspect of another exemplary embodiment, there is provided a control method of an electronic apparatus, the control method including: detecting an object included in received video data using feature information respectively acquired by at least two of a plurality of predetermined filters; and wherein the detecting includes: generating a plurality of confidence maps respectively corresponding to the plurality of predetermined filters using a plurality of feature information, respectively; acquiring a first confidence map and a second confidence map among the generated plurality of confidence maps; generating a final confidence map using the acquired first confidence map and the acquired second confidence map; and detecting the object by analyzing the final confidence map.

Each of the plurality of feature information may include a probability value representing a reliability of the object and positional information of the object.

The first confidence map may be a map generated by using feature information acquired from a filter after a preset filter of the plurality of predetermined filters; and the second confidence map may be a map generated by using feature information acquired from a last filter of the plurality of predetermined filters.

The control method may further include adjusting a size of at least one of the first confidence map and the second confidence map so as to be a same size.

The detecting the object by analyzing the final confidence map may include detecting the object according to whether a probability value representing a reliability of the object is greater than or equal to a preset threshold value from the final confidence map.

According to various exemplary embodiments as described above, an electronic apparatus can more accurately detect surrounding vehicles and pedestrians even under the general road condition, the road conditions of night time and bad weather, and the like.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF EXEMPLARY EMBODIMENTS

Figure 1:
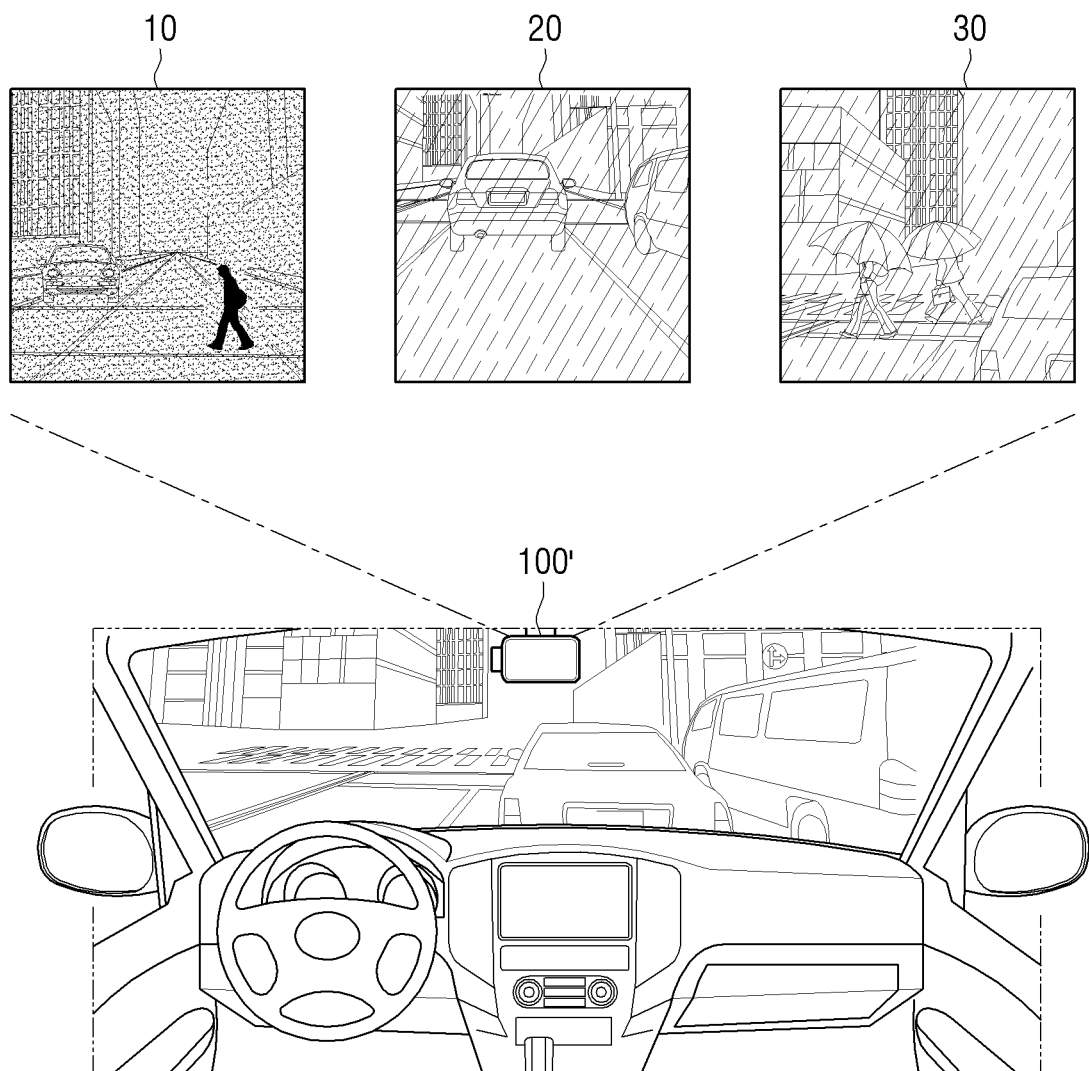
FIG. 1 is an exemplified diagram illustrating an environment in which an object is not recognized in a related art electronic apparatus.

Hereinafter, one or more exemplary embodiments will be described with reference to the accompanying draws. It is understood that terms used herein are for descriptive purposes and are not to be understood as limiting. The present disclosure may be variously modified and changed, and aspects of disclosed exemplary embodiments may be combined.

Additionally, it is understood that terms used in the present specification and claims are selected as general terms in consideration of functions of various exemplary embodiments. However, these terms may be changed depending on intention of a person having ordinary skill in the art, legal or technical analysis, development of new technologies, or the like.

Further, like reference numerals or signs described in the respective drawings accompanying the present specification represent parts or components performing substantially the same function. For convenience of explanation and understanding, a plurality of exemplary embodiments will be described using like reference numerals or signs. In other words, even though components having like reference numerals are all illustrated in a plurality of drawings, the plurality of drawings do not reflect a single exemplary embodiment.

Further, to differentiate between components in the present specification and claim, terms including ordinal numbers like "first," "second," or the like may be used. The ordinal numbers are used to differentiate like or similar components from each other and the meaning of the terms should not be restrictively analyzed by the use of the ordinal numbers. For example, a use order, a disposition order, or the like of components coupled to the ordinal numbers should not be limited by the numbers. If necessary, the respective ordinal numbers may also be used by being replaced with each other. Also, it is understood that expressions such as "at least one of," when preceding a list of elements, modify the entire list of elements and do not modify the individual elements of the list.

In the present specification, singular forms are intended to include plural forms unless the context clearly indicates otherwise. It will be further understood that the terms "comprises" or "have" used in this specification specify the presence of features, numerals, steps, operations, components, parts mentioned in this specification, or a combination thereof, but do not preclude the presence or addition of one or more other features, numerals, steps, operations, components, parts, or a combination thereof.

Further, in the exemplary embodiment of the present disclosure, the terms "module," "unit," "part," etc., are terms naming components for performing at least one function or operation and these components may be implemented as hardware or software or implemented by a combination of hardware and software. Further, a plurality of "modules," "units," "parts," etc., may be integrated as at least one module or chip to be implemented as at least one processor, except for the case in which each of the "modules," "units," "parts," etc., must be implemented as an individual specific hardware.

Moreover, in one or more exemplary embodiments, when any portion is connected to other portions, this includes a direct connection and an indirect connection, e.g., through other media. In addition, unless explicitly described otherwise, the meaning that any portion includes any components will be understood to imply the inclusion of other components but not the exclusion of any other components.

Hereinafter, various exemplary embodiments will be described in detail with reference to the accompanying drawings.

FIG. 1 is an exemplified diagram illustrating an environment in which an object is not recognized in a related art electronic apparatus 100'.

As illustrated in FIG. 1, an electronic apparatus 100' provided in transportation apparatuses such as a vehicle may be, for example, a black box, a smart phone, or the like, which photographs conditions of a road on which the transportation apparatus is driving in real time. Such an electronic apparatus 100' may photograph a front area and a rear area of a road on which a transportation apparatus travels in real time and detect objects such as people and vehicles in photographed video data using an object detection algorithm.

Thereafter, the electronic apparatus 100' provides at least one of type information of the detected object, positional information of the detected object, and movement information of the detected object. Accordingly, a driver who operates the transportation apparatus may recognize the road environmental conditions in front of a vehicle or behind the vehicle on a road on which the vehicle is driving on the basis of the information provided through the electronic apparatus 100', thereby enabling safe driving.

However, the electronic apparatus 100' providing information on various objects existing on the road may not detect the corresponding object under the following environmental conditions.

As illustrated in FIG. 1, in a first driving environment 10 in which the transportation apparatus drives on a road in the dark (e.g., at night time or in a tunnel), the electronic apparatus 100' may not detect an object such as a pedestrian from the photographed video data. In addition, the electronic apparatus 100' may not detect an object such as the pedestrian or a surrounding vehicle from the photographed video data in a second driving environment 20 in which the transportation apparatus is driving on a road in rainy weather. In addition, in a third driving environment 30 in which a part of a pedestrian is covered by an umbrella, the electronic apparatus 100' may not detect the pedestrian covered by the umbrella from the photographed video data.

Under such environmental conditions, a driver find it difficult or unsafe to drive the transportation apparatus. If the electronic apparatus 100' does not detect objects on a road on which a vehicle is driving under these environmental conditions, the probability of the occurrence of accidents by a driver driving the transportation apparatus may increase.

Hereinafter, an electronic apparatus 100' according to one or more exemplary embodiments will be described in detail.

Figure 2:
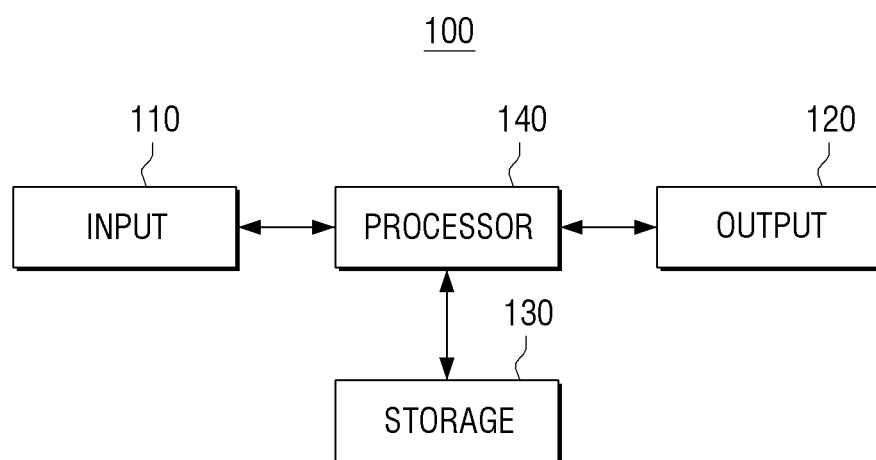
FIG. 2 is a schematic block diagram of an electronic apparatus for detecting an object from video data according to an exemplary embodiment.

FIG. 2 is a schematic block diagram of an electronic apparatus 100 for detecting an object from video data according to an exemplary embodiment of the present disclosure.

As illustrated in FIG. 2, the electronic apparatus 100 includes an input 110 (such as an input unit, input circuitry, or an input device), an output 120 (such as an output unit, output circuitry, or an output device), a storage 130, and at least one hardware processor 140.

The input 110 receives video data photographed or captured by a camera. Here, the input 110 may include an input terminal or interface. The output 120 outputs at least one of video and audio from the video data input through the input 110. Here, the output may include an output terminal or interface, a speaker, a display, etc. In addition, the output 120 outputs information on the object detected from the video data through at least one of the video and the audio. Here, the information on the object detected from the video data may include at least one of type information, positional information, and movement information of the object.

The storage 130 may store a set of filters including a plurality of filters for detecting feature points representing objects included in the photographed video data.

Accordingly, the processor 140, which will be described in detail below, may detect the object from the video data input through the input 110 using the set of the filters stored in the storage 130.

Specifically, the processor 140 acquires the feature information representing the object from the video data input through the input 110 using the plurality of filters included in the set of the filters. Thereafter, the processor 140 detects the object included in the corresponding video data using the feature information acquired through at least two filters of the plurality of filters and controls the output 120 to output the information on the detected object.

Here, the feature information may include a probability value representing the reliability of the object and information on a position of the corresponding object.

Specifically, the processor 140 generates a confidence map corresponding to each of the plurality of filters using each of the feature information acquired from the plurality of filters constituting the set of the filters. Thereafter, the processor 140 acquires first and second confidence maps of the confidence maps corresponding to each of the plurality of filters, and generates a final confidence map using the acquired first and second confidence maps. Thereafter, the processor 140 may analyze the final confidence map and detect the object from the video data input through the input 110.

Here, the first confidence map may be a map generated using the feature information acquired from a filter after a predetermined filter among the plurality of filters, and the second confidence map may be a map generated using the feature information acquired from a last filter among the plurality of filters, although it is understood that one or more other exemplary embodiments are not limited thereto. For example, according to another exemplary embodiment, the first confidence map may be generated using the feature information acquired from the predetermined filter among the plurality of filters.

Additionally, while the final confidence map according to the present exemplary embodiment is generated using the first and second confidence maps, it is understood that one or more other exemplary embodiments are not limited thereto. For example, according to another exemplary embodiment, the first and second confidence maps and/or the final confidence map may be generated using one or more other confidence maps generated using feature information acquired from one or more other filters.

More specifically, the processor 140 acquires first feature information representing the object included in the video data from the video data input through the input 110 using the first filter among the plurality of filters constituting the set of the filters. Thereafter, the processor 140 generates the confidence map based on the first feature information, as described above. Thereafter, the processor 140 uses the second filter of the plurality of filters to acquire second feature information representing the corresponding object from the confidence map generated based on the first feature information. Next, the processor 140 pools (i.e., resizes) the confidence map generated based on the second feature information to a preset size. The processor 140 then uses a third filter to acquire third feature information representing the corresponding object from the pooled confidence map.

If the third filter is the last filter, the processor 140 may use the confidence map generated based on the feature information acquired from at least one of the first and second filters and the confidence map generated based on the third feature information acquired from the last filter to generate the final confidence map.

Subsequently, the processor 140 compares a probability value representing reliability of the object with a preset threshold value from the previously-generated final confidence map and detects the object from the video data if the probability value is equal to or greater than the preset threshold value. Thereafter, the processor 140 may acquire the type information of the corresponding object based on the type of the detected object.

Accordingly, the processor 140 may control the output 120 to output at least one of the type information, the positional information, and the movement information of the object detected from the input video data In addition, the processor 140 may use at least one of the type information, the positional information, and the movement information of the object detected from the input video data to generate at least one of distance information between the electronic apparatus 100 and the corresponding object, dangerous situation information, and blind spot notification information. The processor 140 may then control to transmit the information to another electronic apparatus that is provided in the transportation apparatus through the communicator 150 to be described below to provide driving information of the transportation apparatus. Accordingly, another electronic apparatus may provide or output at least one of the distance information from the previously-detected object, the dangerous situation information, and the blind spot notification information based on the information received from the electronic apparatus 100.

Hereinafter, an operation of detecting an object from video data in an electronic apparatus 100 according to an exemplary embodiment will be described in detail.

Figure 3:
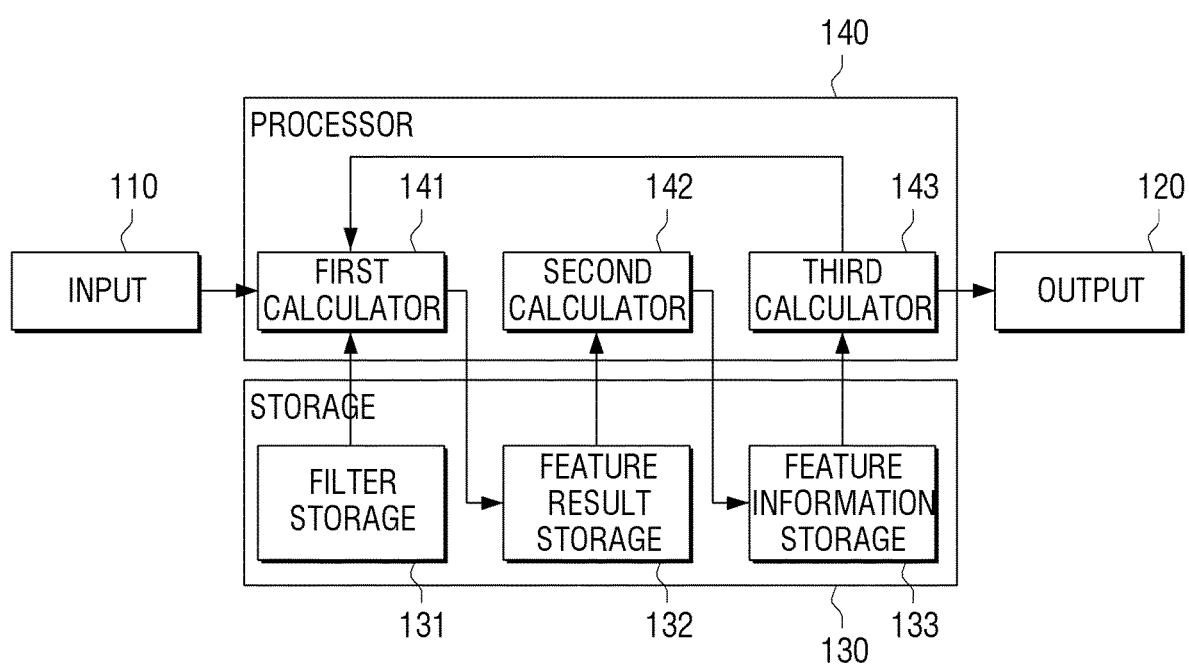
FIG. 3 is a detailed block diagram of an electronic apparatus for detecting an object from video data according to an exemplary embodiment.

FIG. 3 is a detailed block diagram of an electronic apparatus 100 for detecting an object from video data according to an exemplary embodiment.

Referring to FIG. 3, the processor 140 includes first to third calculators 141 to 143, and the storage 130 includes a filter storage 131, a feature result storage 132, and a feature information storage 133.

Specifically, if first video data is input through the input 110, the first calculator 141 uses parameters set in a first filter among the plurality of filters constituting the filter set pre-stored in the filter storage 131 to acquire a first feature value for an object from the video data and stores the first feature value in the feature result storage 132.

The second calculator 142 acquires first feature information that includes a probability value representing the reliability of the object (e.g., a probability that the object is an object) and the positional information of the corresponding object based on the first feature value stored in the feature result storage 132 and stores the acquired first feature information in the feature information storage 133. Accordingly, the third calculator 143 generates the first confidence map corresponding to the first filter based on the first feature information stored in the feature information storage 133.

If the first confidence map is generated, the first calculator 141 acquires a second feature value for the corresponding object from the first confidence map using the parameters set in a second filter, and stores the second feature value in the feature result storage 132.

The second calculator 142 then acquires the second feature information that includes a probability value representing the reliability of the object and the positional information of the corresponding object based on the second feature value stored in the feature result storage 132 and stores the acquired second feature information in the feature information storage 133. The third calculator 143 generates the second confidence map corresponding to the second filter based on the second feature information stored in the feature information storage 133.

If the third confidence map corresponding to the third filter, which is the last filter, among the plurality of filters is generated by the above-describes series of processes, the third calculator 143 may generate the final confidence map using the previously-generated first to third confidence maps.

However, it is understood that one or more other exemplary embodiments are not limited thereto, and the third calculator 143 may use one of the previously-generated first and second confidence maps and the third confidence map generated corresponding to the third filter that is the last filter to generate the final confidence map.

If the final confidence map is generated, the third calculator 143 compares the probability value representing the reliability of the corresponding object with the preset threshold value from the final confidence map, detects the corresponding object if the probability value is equal to or greater than the preset threshold value, and transmits or provides the information on the detected object to the output 120. Accordingly, the output 120 may output the information on the object detected from the video data as at least one of the video and the audio.

Hereinafter, a process of detecting an object from input video data and detection results in an electronic apparatus 100 according to an exemplary embodiment and the related art electronic apparatus 100' will be compared and described.

Figure 4:
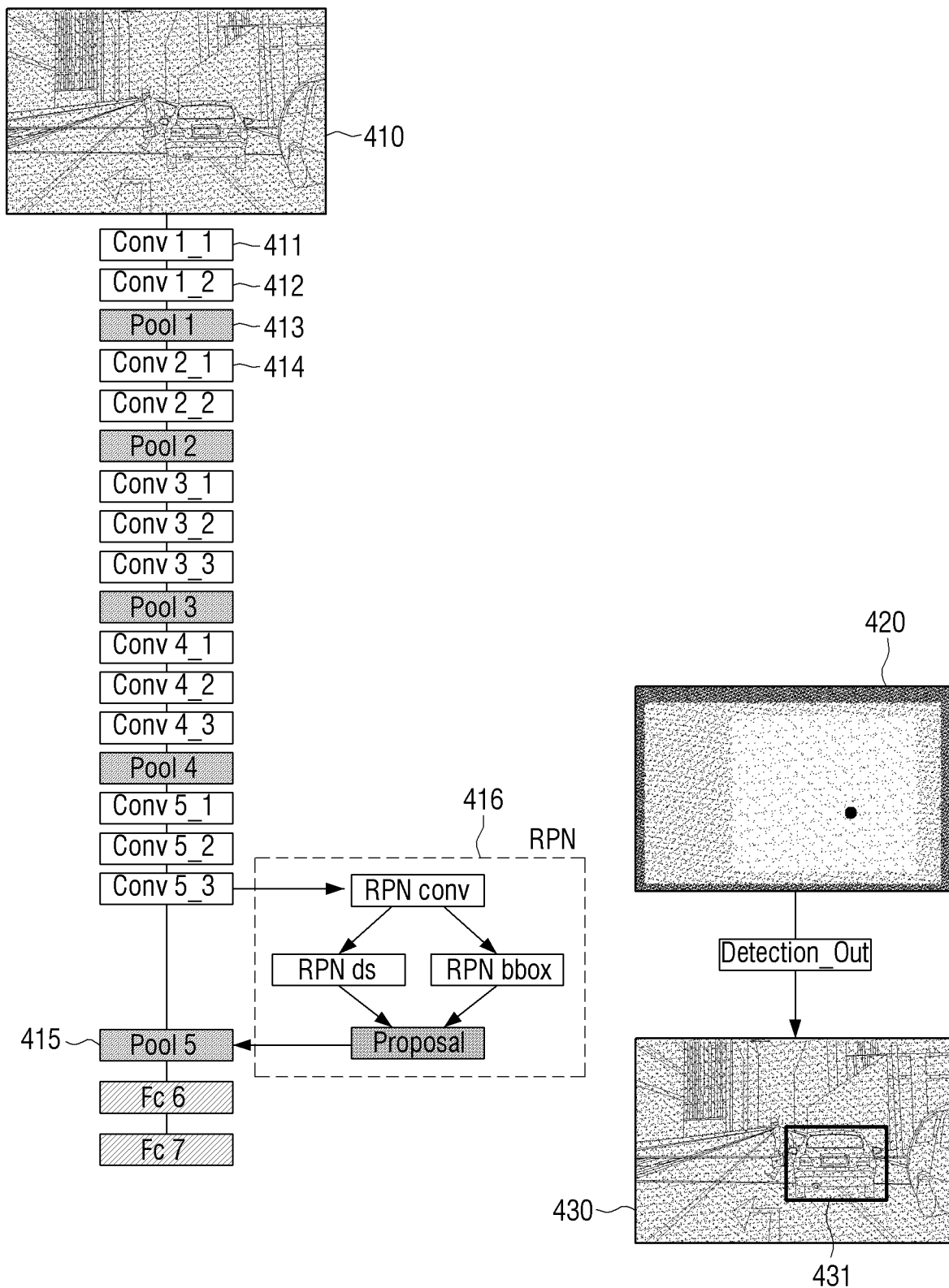
FIG. 4 is an exemplified diagram illustrating a process of detecting an object and a detection result in a related art electronic apparatus.

FIG. 4 is an exemplified diagram illustrating a process of detecting an object and a detection result in a related art electronic apparatus 100'.

As illustrated in FIG. 4, if video data 410 is input, a related art electronic apparatus 100' uses a plurality of filters included in the set of filters to acquire the feature value for the object from the input video data.

In this case, if the video data 410 is input, the related art electronic apparatus 100' uses the parameters set in a first filter to acquire first feature information on the object from the video data 410. Thereafter, the electronic apparatus 100' acquires a first confidence map (conv 1_1) 411 corresponding to the first filter based on the first feature information.

The electronic apparatus 100' then uses the parameters set in a second filter to acquire second feature information from the first confidence map 411 and acquire a second confidence map (conv 1_2) 412 corresponding to the second filter based on the acquired second feature information.

The electronic apparatus 100' pools (pool 1) 413 the second confidence map 412 to a predetermined size to acquire the pooled confidence map. Thereafter, the electronic apparatus 100' uses a third filter to acquire third feature information from the pooled confidence map, and acquires a third confidence map (conv 2_1) 414 corresponding to the third filter based on the acquired third feature information.

If an n-th confidence map (conv 5_3) 415 corresponding to the last (n-th) filter is acquired by a series of processes, the related art electronic apparatus 100' determines a previously-acquired n-th confidence map 415 as the final confidence map 420.

If the final feature information is acquired from the predetermined final confidence map 420, the related art electronic apparatus 100' uses a position predictor (RPN) 416 to acquire the positional information of the object included in the video data 410 first input from the previously-acquired final feature information. Here, the above-described feature information may be the feature value for the object.

Accordingly, the related art electronic apparatus 100' may acquire the positional information of the object from the feature value included in the final feature information previously-acquired by the position predictor (RPN).

Thereafter, the related art electronic apparatus 100' acquires the type information of the object from the feature value included in the final feature information previously-acquired. Additionally, the related art electronic apparatus 100' may provide the object detection result information 430 representing the type of the corresponding object and a point at which the object is positioned based on the type information and the positional information of the previously-acquired object.

That is, the related art electronic apparatus 100' provides only the object detection result information 430 in which a first object corresponding to a car 431 is detected, by the object detection result information 430.

On the other hand, the input video data may include the first object corresponding to the car 431 and a second object corresponding to a person partially superimposed on the first object. However, the related art electronic apparatus 100' does not detect the second object superimposed on the first object, and provides only the object detection result information 430 in which the first object corresponding to the car 431 is detected.

Figure 5:
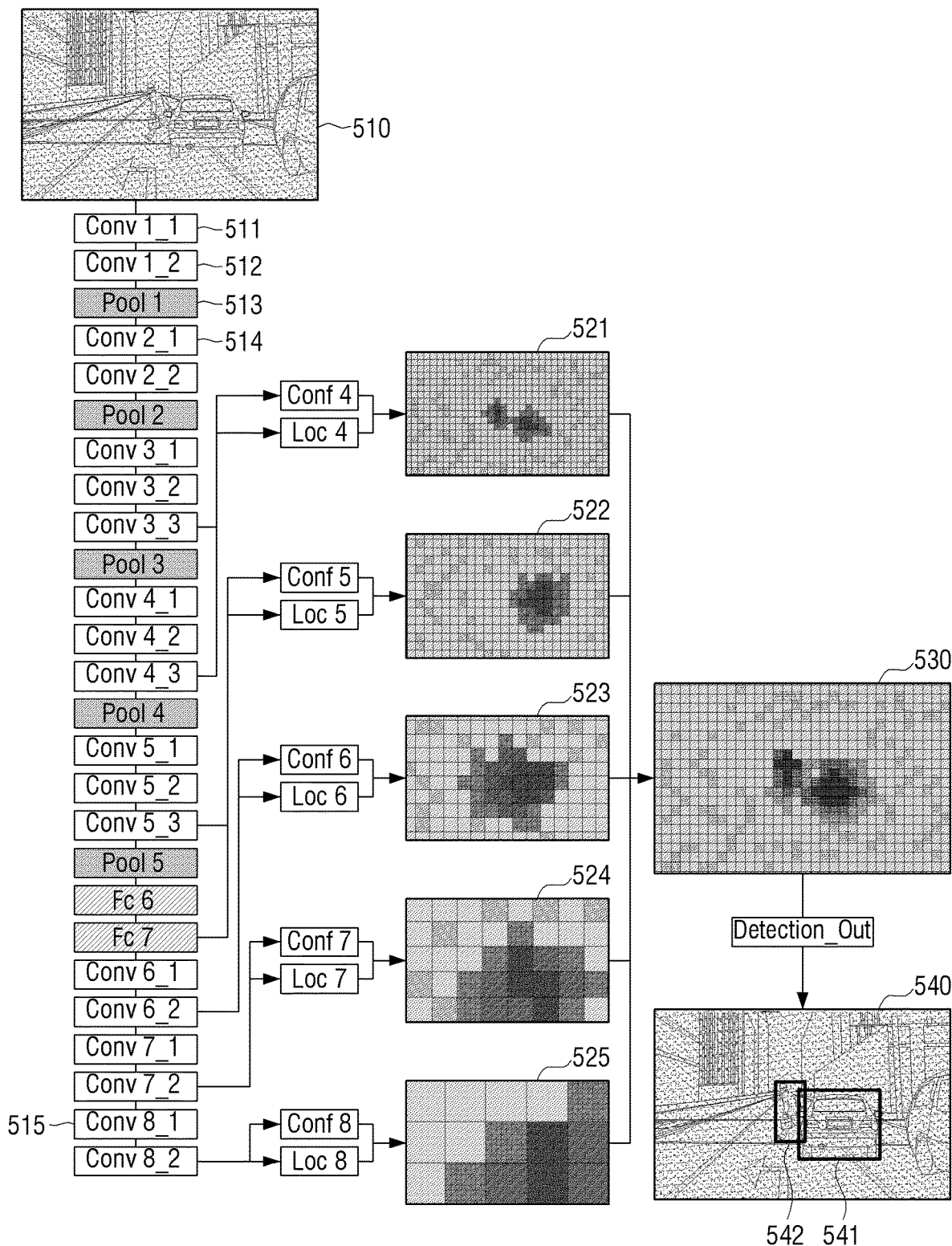
FIG. 5 is an exemplified diagram illustrating a process of detecting an object and a detection result in an electronic apparatus according to an exemplary embodiment.

FIG. 5 is an exemplified diagram illustrating a process of detecting an object and a detection result in an electronic apparatus 100 according to an exemplary embodiment.

As illustrated in FIG. 5, if video data 510 is input, the electronic apparatus 100 uses the parameters set in a first filter of the plurality of filters included in the set of filters to acquire a feature value for the object from the input video data. The electronic apparatus 100 acquires feature information that includes the probability value representing the reliability of the object and the positional information of the corresponding object, based on the previously-acquired feature value. The electronic apparatus 100 then generates a first confidence map (conv 1_1) 511 corresponding to the first filter based on the previously-acquired feature information.

If the first confidence map 511 is generated, the electronic apparatus 100 uses the parameters set in a second filter to acquire a feature value for the corresponding object from the first confidence map 511. Thereafter, the electronic apparatus 100 acquires feature information that includes the probability value representing the reliability of the object and the positional information of the corresponding object, based on the previously-acquired feature value. The electronic apparatus 100 generates a second confidence map (conv 1_2) 512 corresponding to the second filter based on the previously-acquired feature information.

If the second confidence map 512 is generated, the electronic apparatus 100 pools the previously-generated second confidence map 512 to a predetermined size, and generates the pooled confidence map 513. The electronic apparatus 100 uses the parameters set in a third filter to acquire a feature value for the corresponding object from the pooled confidence map 513. Thereafter, the electronic apparatus 100 acquires feature information that includes the probability value representing the reliability of the object and the positional information of the corresponding object, based on the previously-acquired feature value. The electronic apparatus 100 generates a third confidence map (conv 2_1) 514 corresponding to the third filter based on the previously-acquired feature information.

If an n-th confidence map (conv 8_2) 515 corresponding to the last (n-th) filter is acquired by the series of processes, the electronic apparatus 100 acquires an n-th confidence map (conv 8_2) 515 and a confidence map corresponding to the predefined filter among the previous confidence maps.

Furthermore, the electronic apparatus 100 determines the n-th confidence map (conv 8_2) 515 and the confidence map corresponding to the predefined filter as a reference confidence map (hereinafter, referred to as first to fourth reference confidence maps 521 to 525). The electronic apparatus 100 adjusts sizes of first to fourth reference confidence maps 521 to 525 to be the same size. The electronic apparatus 100 uses the first to fourth reference confidence maps 521 to 525 adjusted to the same size to generate a final confidence map 530.

However, it is understood that one or more other exemplary embodiments are not limited thereto. For example, according to another exemplary embodiment, the electronic apparatus 100 may adjust the sizes of each of the confidence maps to be the same preset size when the confidence map is generated corresponding to each of the plurality of filters.

If the final confidence map 530 is generated, the electronic apparatus 100 acquires the feature information representing the object from the previously-generated final confidence map 530, and detects the object included in the previously-input video data based on the acquired feature information. Thereafter, the electronic apparatus 100 provides the object detection result 540 for the input video data based on the position and the type information of the detected object.

As described with reference to FIG. 4, the input video data 510 may include a first object corresponding to the car and a second object corresponding to a person partially superimposed on the first object. In this case, the electronic apparatus 100 according to an exemplary embodiment may detect a first object 541 corresponding to a car from the input video data 510 and a second object 542 corresponding to a person partially superimposed on the first object by the series of performance processes as described above and may provide the object detection result information 540 in which the first and second objects 541 and 542 are detected.

Hereinafter, an operation of adjusting sizes of first to fifth reference confidence maps 521 to 525 used to generate the final confidence map 530 described above in the electronic apparatus 100 according to an exemplary embodiment will be described.

Figure 6:
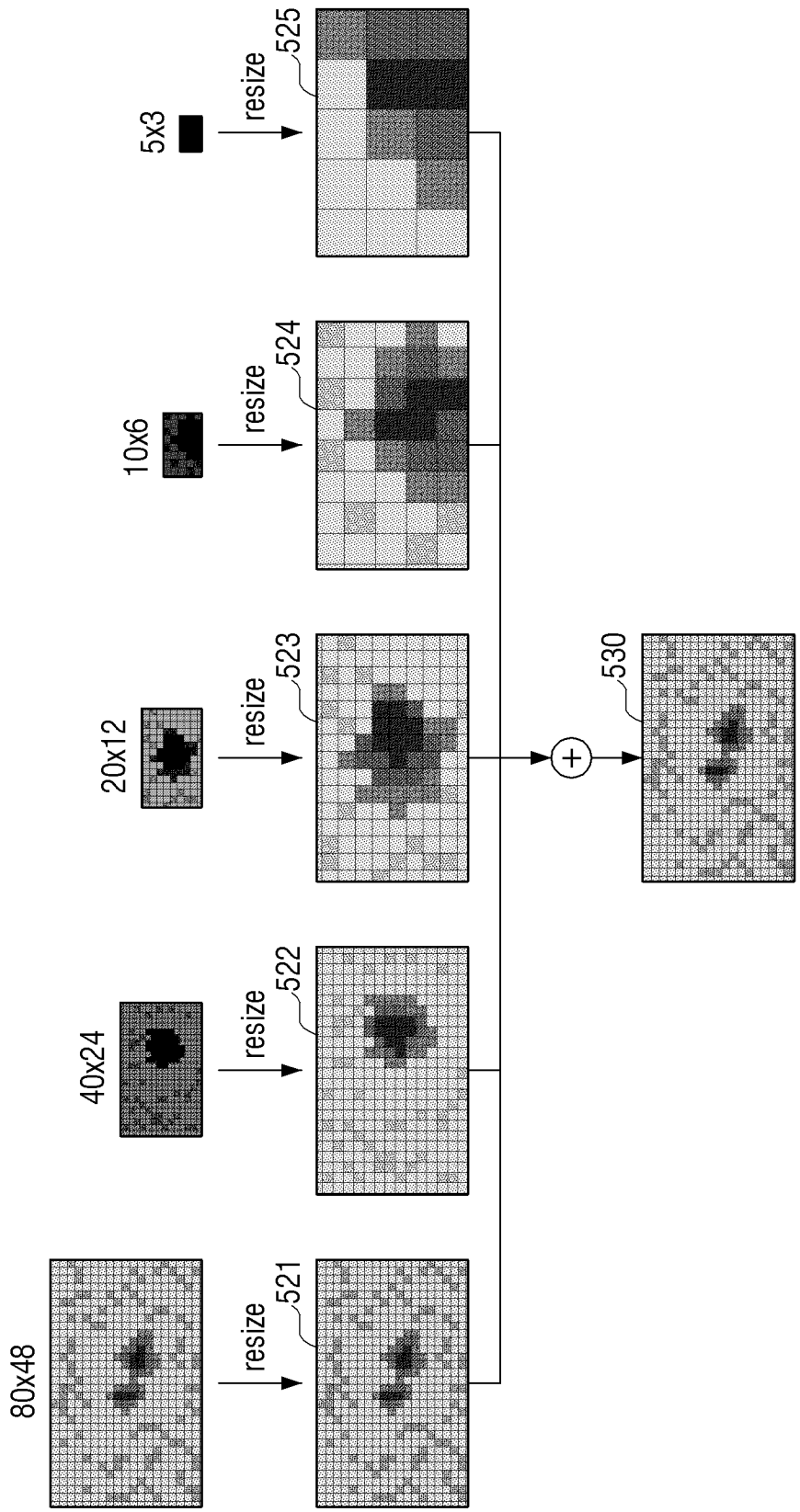
FIG. 6 is an exemplified diagram for adjusting a size of a reference confidence map used to generate a final confidence map in an electronic apparatus according to an exemplary embodiment.

FIG. 6 is an exemplified diagram for adjusting a size of a reference confidence map used to generate a final confidence map in an electronic apparatus 100 according to an exemplary embodiment.

As described in FIG. 5, the electronic apparatus 100 may determine the confidence map corresponding to the predefined filter among the confidence maps corresponding to each of the plurality of filters and the confidence map corresponding to the last (n-th) filter as the first through fifth reference confidence maps 521 to 525.

Each of the confidence maps determined as the first to fifth reference confidence maps 521 to 525 may be pooled to the predetermined size.

For example, the confidence map determined as the first reference confidence map 521 may be a map whose size is adjusted in units of 80×48 pixels, and the confidence map determined as the second reference confidence map 522 may be a map whose size is adjusted from units of 80×48 pixels to units of 40×24 pixels.

Additionally, the confidence map determined as the third reference confidence map 523 may be a map whose size is adjusted from units of 40×24 pixels to units of 20×12 pixels, and the confidence map determined as the fourth reference confidence map 524 may be a map whose size is adjusted from units of 20×12 pixels to units of 10×64 pixels. The confidence map corresponding to the last (nth) filter determined as the fifth reference confidence map 525 may be a map whose size is adjusted from units of 10×6 pixels to units of 5×3 pixels.

Therefore, the electronic apparatus 100 adjusts the sizes of each of the confidence maps determined as the first to fifth reference confidence maps 521 to 525 to be the same preset size.

According to an exemplary embodiment, the electronic apparatus 100 may adjust the sizes of the confidence maps corresponding to the second to fifth confidence maps 522 to 525 to be the size of the confidence map corresponding to the first reference confidence map 521 represented by the largest size among the sizes of each of the confidence maps determined as the first to fifth reference confidence maps 521 to 525.

That is, the electronic apparatus 100 adjusts each of the confidence maps corresponding to the second to fifth confidence maps 522 to 525 to be expressed by a size in units of 80×48 pixels. Accordingly, the confidence maps corresponding to each of the first to fifth reference confidence maps 521 to 525 may have a size in units of 80×48 pixels.

The electronic apparatus 100 may then generate the final confidence map 540 as described in FIG. 5 using the first to fifth reference confidence maps 521 to 525 adjusted to the same size as described above.

Figure 7A:
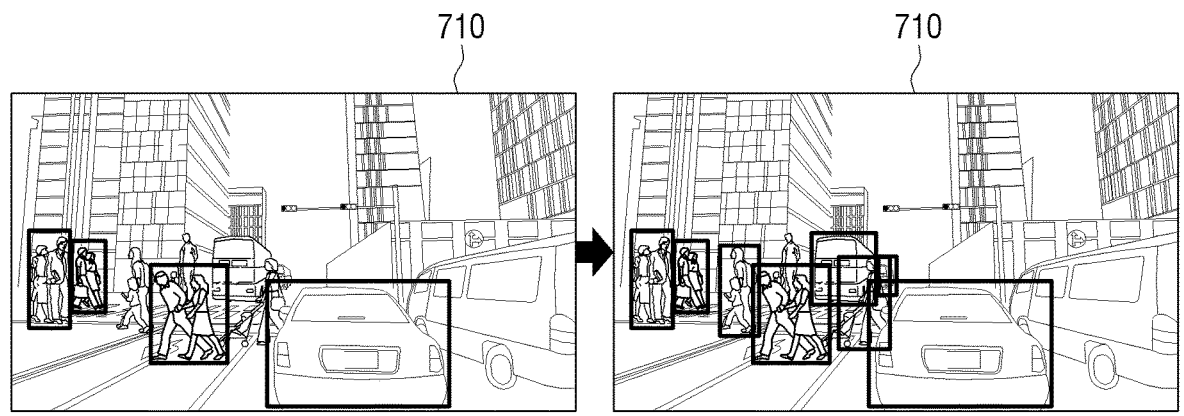
FIGS. 7A and 7B are exemplified diagrams illustrating results of detecting an object from video data in an electronic apparatus according to an exemplary embodiment and a related art electronic apparatus.
Figure 7B:
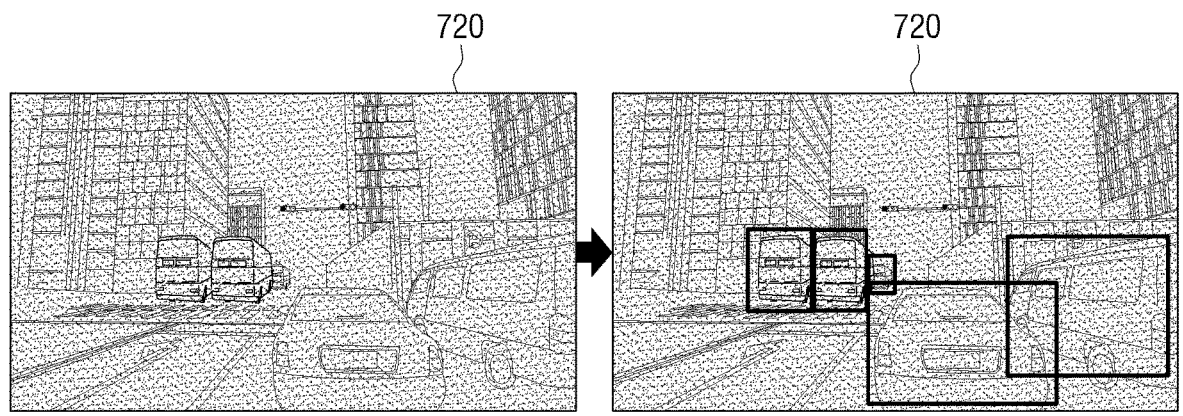

FIGS. 7A and 7B are exemplified diagrams illustrating results of detecting an object from video data in an electronic apparatus 100 according to an exemplary embodiment and the related art electronic apparatus 100'.

As illustrated in FIG. 7A, if a plurality of objects are superimposed on the input video data, the related art electronic apparatus 100' does not detect the superimposed object. For example, if a bus stopped in front of a crosswalk is partially covered by a person running across a crosswalk or a vehicle and the bus overlap each other or a crowd of people run across the crosswalk, the related art electronic apparatus 100' does not detect objects for a bus, a vehicle, and a crowd of people running across a crosswalk from video data 710 captured in such a road environment.

On the other hand, the electronic apparatus 100 according to an exemplary embodiment can detect objects for each of the bus, the vehicle, and the crowd of people running across the crosswalk from the video data 710 captured in such a road environment by the above-described performance processes.

In addition, as illustrated in FIG. 7B, the related art electronic apparatus 100' does not detect an object for a driving vehicle from video data 720 photographed in dark conditions (such as at a night road environment), whereas an electronic apparatus 100 according to an exemplary embodiment may detect the object for the vehicle which is driving from the video data 720 obtained by photographing in the dark environment.

Figure 8:
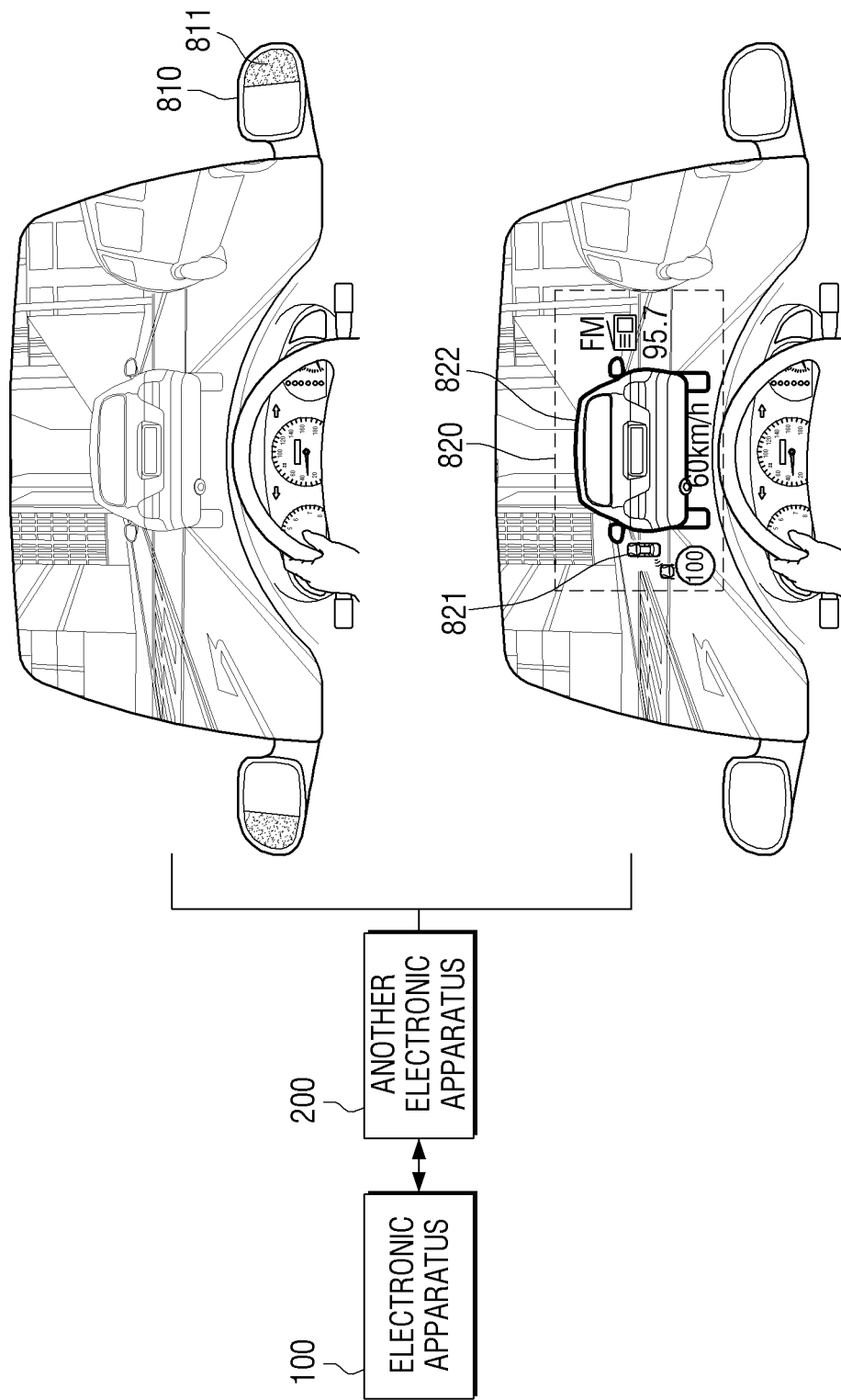
FIG. 8 is a diagram illustrating an example of providing driving information according to the results of detecting an object by an electronic apparatus according to an exemplary embodiment.

FIG. 8 is a diagram illustrating an example of providing driving information according to the results of detecting an object by an electronic apparatus 100 according to an exemplary embodiment.

As illustrated in FIG. 8, the electronic apparatus 100 uses at least one of the type information, the positional information, and the movement information of the object detected from the photographed video data to generate at least one of the distance information from the object, the dangerous situation information, and the blind spot notification information that are previously-detected and transmit the generated information to another electronic apparatus 200 provided in the transportation apparatus.

Accordingly, another electronic apparatus 200 may provide at least one of the distance information from the object, the dangerous situation information, and the blind spot notification information that are received from the electronic apparatus 100.

For example, as illustrated in FIG. 8, another electronic apparatus 200 may provide the blind spot notification information received from the electronic apparatus 100 through an electronic mirror (E-mirror) 810 which visually provides risk factors for the surrounding circumstances or environment of the transportation apparatus.

Specifically, if the blind spot notification information is received from the electronic apparatus 100, another electronic apparatus 200 controls the electronic mirror 810 on the basis of the received blind spot notification information so that one area of the electronic mirror 810 is displayed differently from the remaining area. Accordingly, an area of the electronic mirror 810 is indicated or distinguished by a red color 811, so the driver of the transportation apparatus may recognize that the vehicle approaches the vicinity of the transportation apparatus based on the notification information displayed on the electronic mirror 810.

In addition, another electronic apparatus 200 may provide blind spot notification information received from the electronic apparatus 100 via a head-up display (HUD) 820 that provides driving information.

Specifically, if the blind spot notification information is received from the electronic apparatus 100, another electronic apparatus 200 controls the head-up display to indicate that surrounding vehicles are close to the transportation vehicle based on the received blind spot notification information. Accordingly, the head-up display 820 can display on an area 821 of a screen that surrounding vehicles approach the transportation vehicle, so the driver of the transportation apparatus may recognize that the vehicle approaches the vicinity of the transportation apparatus based on the notification information displayed on the head-up display 820.

In addition, another electronic apparatus 200 may provide the dangerous situation information on the surrounding vehicles received from the electronic apparatus 100 via the head-up display (HUD) 820 that provides driving information.

For example, if the dangerous situation information is received from the electronic apparatus 100, another electronic apparatus 200 controls the head-up display 820 to display surrounding vehicle information 822 representing that surrounding vehicles approach the front of the transportation vehicle on the basis of the received dangerous situation information. Accordingly, the head-up display 820 can distinguish, from another surrounding vehicle, any surrounding vehicles approaching a transportation vehicle on an area 821 of the screen, so the driver of the transportation apparatus may recognize that the transportation vehicle approaches surrounding vehicles in front of the transportation vehicle by the head-up display 820.

Meanwhile, the electronic apparatus 100 according to an exemplary embodiment may use at least one of the type information, the positional information, and the movement information of the detected object to separately provide at least one of the distance information from the corresponding object, the dangerous situation information, and the blind spot notification information.

Hereinafter, a detailed configuration of an electronic apparatus 100 according to an exemplary embodiment will be described.

Figure 9:
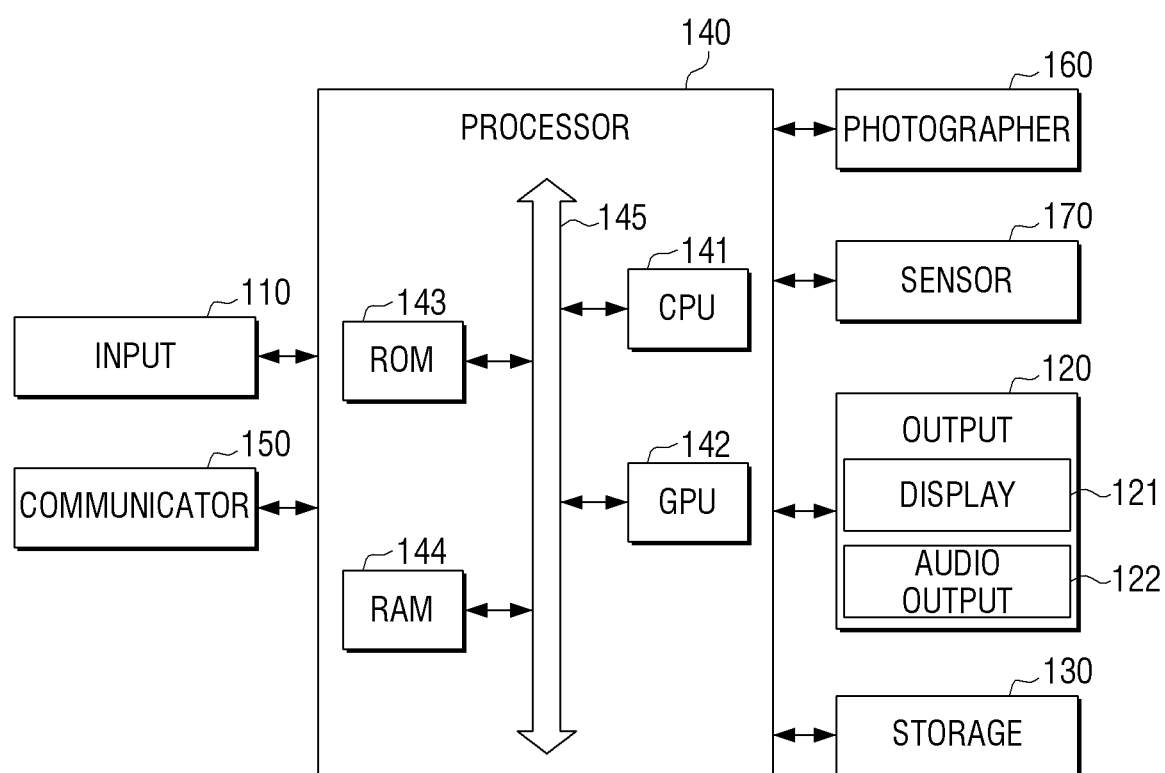
FIG. 9 is a detailed block diagram of an electronic apparatus according to an exemplary embodiment.

FIG. 9 is a detailed block diagram of an electronic apparatus 100 according to an exemplary embodiment.

As illustrated in FIG. 9, the electronic apparatus 100 further includes a communicator 150, a photographer 160, and a sensor 170 in addition to the input 110, the output 120, the storage 130, and a processor 140.

First, as described above, the input 110 receives the video data photographed or captured by the camera. In addition, the input 110 may include an input means, device, or circuitry for receiving various user commands and transmitting the user commands to the processor 140. In this case, the input 110 may include a touch pad capable of a touch input or a key pad having various function keys, numeric keys, character keys, or the like.

In addition, the above-mentioned output 120 includes a display 121 and an audio output 122. The display 121 displays the driving information of the transportation vehicle and the video image included in the photographed video data on the screen. In addition, the display 121 may visually provide at least one of the distance information from the corresponding object, the dangerous situation information, and the blind spot notification information which are generated based on at least one of the type information, the positional information, and the movement information of the detected object from the photographed video data.

The audio output 122 may output the driving information of the vehicle, an audio signal included in the photographed video data, or the like through a speaker in an audible sound form. In addition, the audio output 122 may output an audio signal for or corresponding to at least one of the distance information from the corresponding object, the dangerous situation information, and the blind spot notification information which are generated based on at least one of the type information, the positional information, and the movement information of the detected object from the photographed video data. For example, the audio output 122 may output a warning sound or message based on at least one of the distance information, the dangerous situation information, and the blind spot notification information.

Meanwhile, the display 121 may be implemented as a liquid crystal display (LCD), an organic light emitting display (OLED), a projector, or the like. In particular, if the above-mentioned input 110 includes a touch input capable of a touch input of a user, the display 121 may be implemented as a touch screen form having a mutual layer structure together with the touch input.

The above-described processor 140 controls an operation of each component of the electrical apparatus 100 as a whole. In particular, the processor 140 may detect an object from the video data input through the input 110 and provide at least one of the type information, the positional information, and the movement information for the detected object, as described above.

Such a processor 140 may include a central processing unit (CPU) 141, a graphics processing unit (GPU) 142, a read-only memory (ROM) 143, and a random-access memory (RAM) 144, in which the CPU 141, the GPU 142, the ROM 143, and the RAM 144 may be connected to each other via a bus 145.

The CPU 141 accesses the storage 130 to perform booting using an operating system (O/S) stored in the storage 130. Further, the CPU 141 performs various operations using various programs, contents, data, and the like that are stored in the storage 130 or obtained from an external storage.

The GPU 142 generates a display screen including various objects like an icon, an image, a text, or the like. In detail, the GPU 142 calculates attribute values, such as coordinate values at which the respective objects will be displayed, shapes, sizes, and colors of the objects, based on a layout of the screen according to the received control command and generates display screens having various layouts including the objects based on the calculated attribute values.

A set of commands for system booting and the like are stored in the ROM 143. When a turn on command is input and thus power is supplied, the CPU 141 copies the O/S stored in the storage 130 to the RAM 144 according to the command stored in the ROM 143 and executes the O/S to boot the system. If the booting is completed, the CPU 141 copies the various programs stored in the storage 130 to the RAM 144 and executes the programs copied to the RAM 144 to execute various operations.

Further, the processor 140 may be implemented as a system-on-a-chip or a system on chip (SOC or SoC) by being combined with each component.

Meanwhile, the foregoing operations of the processor 140 may be executed by programs that are stored in the storage 130. Here, the storage 130 may be implemented as at least one of a memory card (for example, Secure Digital (SD) card, memory stick, etc.) that may be detached from and attached to the ROM 143, the RAM 144, or the electronic apparatus 100, a non-volatile memory, a volatile memory, a hard disk drive (HDD), and a solid state drive (SSD).

The communicator 150 may perform communication with another electronic apparatus 200 included in the transportation vehicle, a terminal apparatus such as a smart phone in the transportation vehicle, an electronic apparatus 100 provided in one or more surrounding vehicles, another electronic apparatus 200 provided in one or more other surrounding vehicles, a server (such as a server collecting traffic conditions), an external electronic apparatus, and the like.

The communicator 150 may be implemented as communication modules such as a short range wireless communication module and a wireless communication module. Here, a short range wireless communication module is a communication module that performs wireless communication with another electronic apparatus 200 positioned at a short distance, a terminal apparatus in the transportation vehicle, or the like, and may be, for example, Bluetooth, Zigbee, near field communication (NFC), or the like.

The wireless communication module accesses the mobile communication network according to various mobile communication standards such as WiFi, 3rd Generation, 3rd Generation Partnership Project (3GPP) and long term evolution (LTE) or the like and may perform communication with a server or the like that collects traffic conditions.

In addition, the communicator 150 may further include a connector including at least one of wired communication modules such as a high-definition multimedia interface (HDMI), a universal serial bus (USB), and Institute of Electrical and Electronics Engineers (IEEE) 1394. The connector may receive content data transmitted from an external server through a wired cable connected to the connector according to the control command of the processor 140 or may transmit pre-stored video data to an external recording medium. Further, the connector may receive power from a power source through the wired cable physically connected to the connector.

The photographer 160 photographs still images or moving images according to the user command or an event generation and may be implemented in plural (e.g., a front camera and a rear camera). Additionally, the photographer may be or may include a camera and/or an image sensor.

The sensor 170 is a sensor for sensing ambient brightness, external temperature, the motion of the electronic apparatus 100, or the like. The sensor 170 may include at least one of an illuminance sensor, a temperature sensor, an accelerometer sensor, a magnetic sensor, a gravity sensor, a gyroscope sensor, or the like.

The illuminance sensor senses the brightness of the surrounding environment, and the temperature sensor may be a sensor that senses the external temperature.

The accelerometer sensor is an acceleration sensor that measures acceleration or impact strength of the moving electronic apparatus 100. The magnetic sensor is a sensor capable of detecting an azimuth angle using a geomagnetic field. The gravity sensor is a sensor capable of detecting in which direction gravity acts and automatically rotates according to a moving direction of the transportation vehicle having the electronic apparatus 100 to sense the direction. Finally, the gyroscope sensor is a sensor that adds a rotation function to the existing accelerometer sensor to recognize a 6-axis direction to thereby help recognize a more elaborate and precise operation.

Hereinafter, a method of detecting an object from photographed video data in an electronic apparatus 100 according to an exemplary embodiment will be described in detail.

Figure 10:
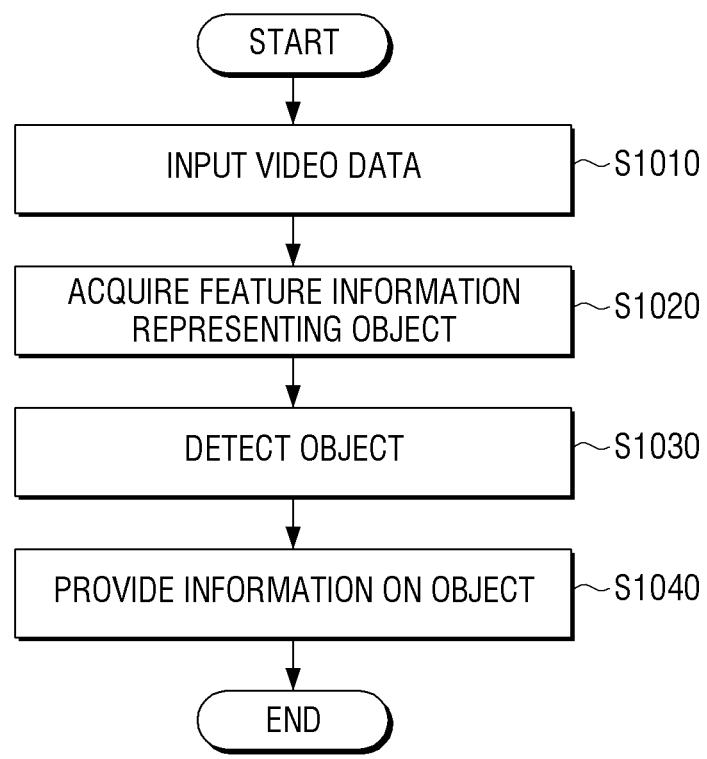
FIG. 10 is a flowchart of a control method of an electronic apparatus for detecting an object from photographed video data according to an exemplary embodiment.

FIG. 10 is a flowchart of a control method of an electronic apparatus 100 for detecting an object from photographed video data according to an exemplary embodiment.

As illustrated in FIG. 10, the electronic apparatus 100 receives video data photographed by the camera. If the video data is input, the electronic apparatus 100 uses the plurality filters constituting the pre-stored set of filters to acquire the feature information representing the object from the previously-input video data (operation S1020). Next, the electronic apparatus 100 uses the feature information acquired through at least two of the plurality of filters to detect the object included in the video data (operation S1030). Next, the electronic apparatus 100 provides information on the detected object (operation S1040).

Here, the feature information may include a probability value representing the reliability of the object and information on a position of the object.

Specifically, the electronic apparatus 100 uses each of the feature information acquired from the plurality of filters constituting the set of the filters to generate a confidence map corresponding to each of the plurality of filters. Thereafter, the electronic apparatus 100 acquires the first and second confidence maps corresponding to each of the predefined at least two filters among the confidence maps corresponding to each of the plurality of filters, and uses the acquired first and second confidence maps to generate the final confidence map. The electronic apparatus 100 may then analyze the generated final confidence map using the first and second confidence maps to detect the object from the previously-input video data.

Hereinafter, a method of acquiring feature information representing an object from video data using a plurality of filters in the electronic apparatus 100, and a method of detecting an object included in video data based on the previously-acquired feature information will be described in detail.

Figure 11:
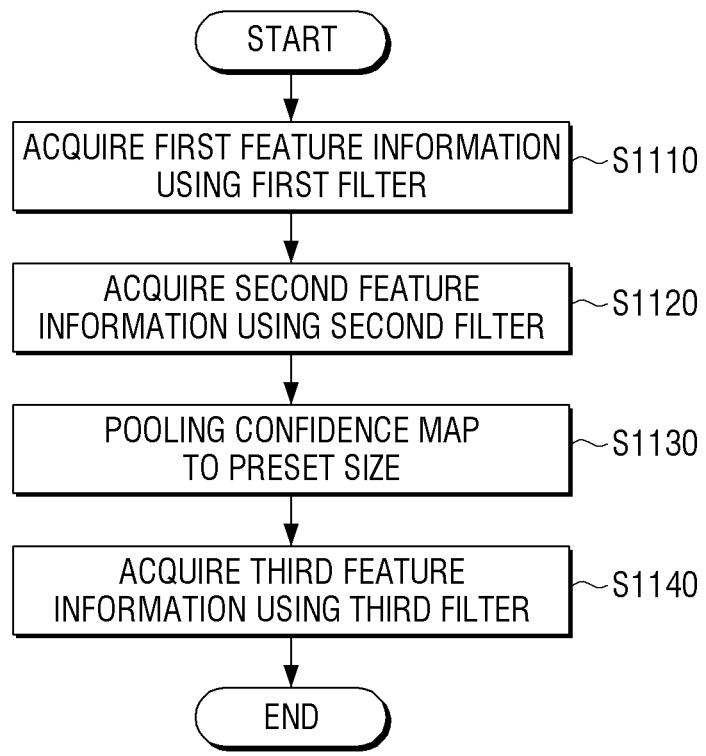
FIG. 11 is a flowchart of a method for acquiring feature information representing an object from video data in an electronic apparatus according to an exemplary embodiment.

FIG. 11 is a flowchart of a method for acquiring feature information representing an object from video data in an electronic apparatus 100 according to an exemplary embodiment.

As illustrated in FIG. 11, if the video data is input, the electronic apparatus 100 acquires first feature information representing the object from the previously-input video data using a first filter among the plurality of filters (operation S1110).

Thereafter, the electronic apparatus 100 uses a second filter to acquire second feature information representing the object from a confidence map generated based on the first feature information (operation S1120). The electronic apparatus 100 pools a confidence map generated based on the second feature information to a preset size (operation S1130). Then, the electronic apparatus 100 uses a third filter to acquire third feature information representing the object from the confidence map pooled to the preset size (operation S1140).

Specifically, if the first video data is input, the electronic apparatus 100 uses the parameters set in the first filter of the plurality of filters to acquire the first feature value for the object form the video data. The electronic apparatus 100 acquires the first feature information that includes the probability value representing the reliability of the object and the positional information of the corresponding object, based on the first feature value. The electronic apparatus 100 then generates the first confidence map corresponding to the first filter based on the acquired first feature information.

Subsequently, the electronic apparatus 100 uses the parameters set in the first filter to acquire the second feature value for the corresponding object from the previously-generated first confidence map. The electronic apparatus 100 acquires the second feature information including the probability value and the positional information representing the reliability of the corresponding object based on the second feature value, and generates the second confidence map corresponding to the second filter based on the acquired second feature information.

Thereafter, the electronic apparatus 100 pools the second confidence map at a preset size. For example, if the second confidence map is a map represented in units of 80×48 pixels, the electronic apparatus 100 may pool the second confidence map in units of 40×24 pixels. As described above, if the second confidence map is pooled to a preset size, the electronic apparatus 100 uses the parameters set in the third filter to acquire the third feature value for the corresponding object from the second confidence map pooled to the preset size. The electronic apparatus 100 acquires the second feature information including the probability value and the positional information representing the reliability of the corresponding object based on the third feature value, and generates the third confidence map corresponding to the second filter based on the acquired second feature information.

If the confidence maps corresponding to each of the plurality of filters are generated by the series of processes, the electronic apparatus 100 may use at least two of the plurality of confidence maps to generate the final confidence map and may detect the object from the generated final confidence map.

Figure 12:
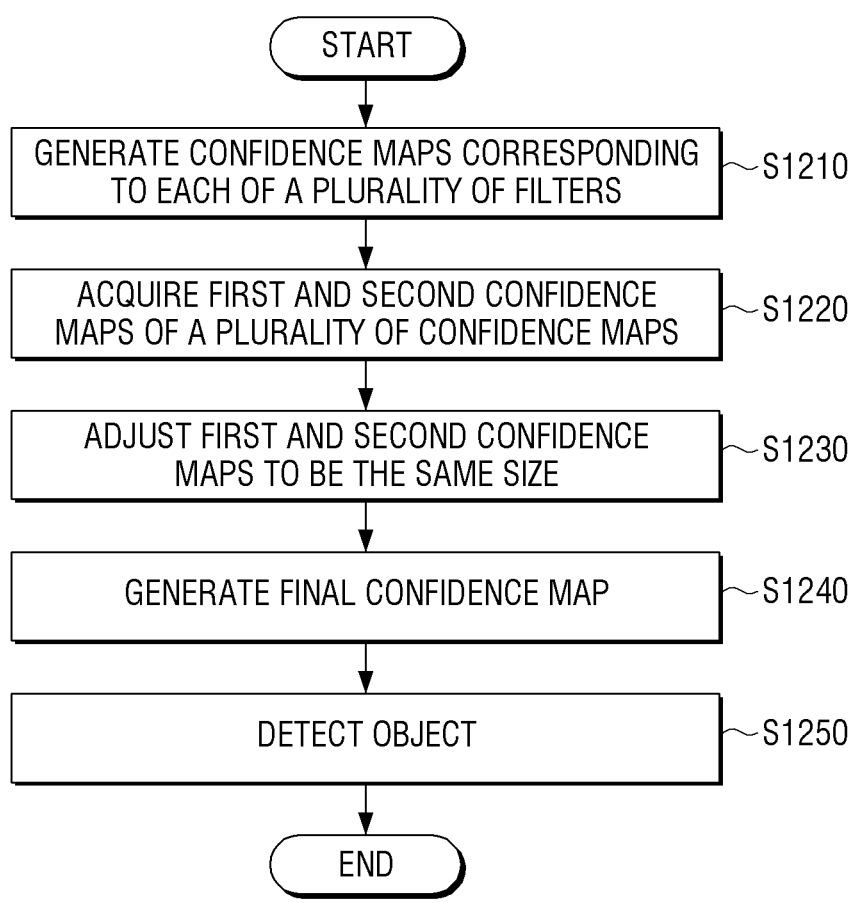
FIG. 12 is a flowchart of a method for detecting an object in an electronic apparatus according to an exemplary embodiment.

FIG. 12 is a flowchart of a method for detecting an object in an electronic apparatus 100 according to an exemplary embodiment.

As illustrated in FIG. 12, the electronic apparatus 100 uses each of the feature information acquired from the plurality of filters to generate a confidence map corresponding to each of the plurality of filters (operation S1210). Thereafter, the electronic apparatus 100 acquires the first and second confidence maps of the confidence maps corresponding to the respective filters (operation S1220).

Here, the first confidence map may be a map generated using the feature information acquired from a filter after a predetermined filter among the plurality of filters, and the second confidence map may be a map generated using the feature information acquired from a last filter among the plurality of filters. However, it is understood that one or more other exemplary embodiments are not limited thereto. For example, according to another exemplary embodiment, the first confidence map may be generated using the feature information acquired from the predetermined filter among the plurality of filters.

If the first and second confidence maps are acquired, the electronic apparatus 100 adjusts the first and second confidence maps to be the same size (operations S1220 and S1230). Thereafter, the electronic apparatus 100 uses the first and second confidence maps adjusted to be the same size to generate the final confidence map, and analyzes the generated final confidence map to detect the object included in the video data (operations S1240 and S1250).

Specifically, the electronic apparatus 100 may acquire the feature information representing the object from the final confidence map, and detect the object included in the previously-input video data based on the acquired feature information.

More specifically, if the feature information representing the object is acquired from the final confidence map, the electronic apparatus 100 compares the probability value representing the reliability of the object included in the previously-acquired feature information with the preset threshold value. As a result of the comparison, if the probability value is greater than or equal to the preset threshold value, the electronic apparatus 100 detects the corresponding object based on the positional information of the object included in the previously-acquired feature information. Thereafter, the electronic apparatus 100 acquires the type information of the detected object from the final confidence map. Next, the electronic apparatus 100 provides the object detection result for the previously-input video data based on at least one of the positional information of the detected object, the type information of the corresponding object, and the movement information of the corresponding object.

Meanwhile, the electronic apparatus 100 is an apparatus provided in the transportation apparatus, and may communicate with another electronic apparatus 200 provided in the corresponding transportation apparatus to provide the driving information. In this case, the electronic apparatus 100 may use at least one of the type information, the positional information, and the movement information of the object detected from the video data to provide at least one of the distance information from the corresponding object, the dangerous situation information, and the blind spot notification information to the other electronic apparatus 200. Accordingly, another electronic apparatus 200 may provide the notification information on the corresponding object through the electronic mirror (E-mirror) or the head-up display based on the information received from the electronic apparatus 100. Alternatively, the electronic apparatus 100 may provide at least one of the type information, the positional information, and the movement information of the object detected from the video data to the other electronic apparatus 200 and the other electronic apparatus 200 may determine or obtain at least one of the distance information from the corresponding object, the dangerous situation information, and the blind spot notification information.

Meanwhile, as described above, the control method of the electronic apparatus 100 may be implemented as at least one execution program that may be stored in a non-transitory computer readable medium.

The non-transitory computer readable medium may be a medium that semi-permanently stores data and is readable by a device. In detail, the foregoing programs may be stored in various types of recording media that are readable by a terminal, such as a random access memory (RAM), a flash memory, a read only memory (ROM), an erasable programmable ROM (EPROM), an electronically erasable and programmable ROM (EEPROM), a register, a hard disk, a removable disk, a memory card, a universal serial bus (USB) memory, a compact-disk (CD) ROM, and the like.

Although one or more exemplary embodiments have been disclosed for illustrative purposes, those skilled in the art will appreciate that various modifications, additions and substitutions are possible, without departing from the scope and spirit of the inventive concept provided in the accompanying claims. Accordingly, such modifications, additions and substitutions should also be understood to fall within the scope of the present disclosure.

What is claimed is:

1. A control method of an electronic apparatus, the control method comprising:
    receiving video data;
    acquiring a plurality of feature information representing an object from the received video data using a plurality of filters, respectively;
    detecting the object included in the received video data using feature information, among the plurality of feature information, acquired by at least two of the plurality of filters; and
    providing information on the detected object,
    wherein the feature information comprises positional information of the object.

2. The control method as claimed in claim 1, wherein each of the plurality of feature information comprises a probability value representing a reliability of the object and the positional information of the object.

3. The control method as claimed in claim 1, wherein the acquiring comprises:
    acquiring, using a first filter of the plurality of filters, first feature information representing the object from the received video data;
    acquiring, using a second filter of the plurality of filters, second feature information representing the object from a first confidence map generated based on the first feature information;
    resizing a second confidence map generated based on the second feature information to a preset size; and
    acquiring, using a third filter of the plurality of filters, third feature information representing the object from the resized second confidence map.

4. The control method as claimed in claim 1, wherein the detecting comprises:
    generating a plurality of confidence maps respectively corresponding to the plurality of filters using the plurality of feature information;
    acquiring a first confidence map and a second confidence map among the generated plurality of confidence maps;
    generating a final confidence map using the acquired first confidence map and the acquired second confidence map; and
    detecting the object by analyzing the final confidence map.

5. The control method as claimed in claim 4, wherein:
    the first confidence map is a map generated by using feature information acquired from a filter after a preset filter of the plurality of filters; and
    the second confidence map is a map generated by using feature information acquired from a last filter of the plurality of filters.

6. The control method as claimed in claim 4, further comprising:
    adjusting a size of at least one of the first confidence map and the second confidence map so as to be a same size.

7. The control method as claimed in claim 4, wherein the detecting the object by analyzing the final confidence map comprises detecting the object according to whether a probability value representing a reliability of the object is greater than or equal to a preset threshold value from the final confidence map.

8. The control method as claimed in claim 1, wherein the providing comprises providing at least one of type information, positional information, and movement information of the detected object.

9. The control method as claimed in claim 8, wherein:
    the electronic apparatus communicates with another electronic apparatus provided in a transportation apparatus to provide driving information; and
    the providing the at least one of the type information, the positional information, and the movement information of the detected object comprises using the at least one of the type information, the positional information, and the movement information of the detected object to provide at least one of distance information from the object, dangerous situation information, and blind spot notification information to the other electronic apparatus.

10. The control method as claimed in claim 1, wherein the electronic apparatus is an apparatus included in a transportation apparatus, and the received video data is video data for a front area or a rear area of a road on which the transportation apparatus is driving.

11. A non-transitory computer-readable recording medium having recorded thereon a program executable by a computer for performing the control method of claim 1.

12. An electronic apparatus, comprising:
an input device configured to receive video data;
an output device configured to output information on an object included in the received video data;
a memory storing instructions; and
at least one processor configured to execute the instructions to acquire a plurality of feature information representing the object from the received video data using a plurality of filters, respectively, to detect the object included in the video data using feature information, among the plurality of feature information, acquired through at least two of the plurality of filters, and to control the output device to output information on the detected object,
wherein the feature information comprises positional information of the object.

13. The electronic apparatus as claimed in claim 12, wherein each of the plurality of feature information comprises a probability value representing a reliability of the object and the positional information of the object.

14. The electronic apparatus as claimed in claim 12, wherein the at least one processor is further configured to:
acquire, using a first filter of the plurality of filters, first feature information representing the object from the received video data;
acquire, using a second filter of the plurality of filters, second feature information representing the object from a first confidence map generated based on the first feature information;
resize a second confidence map generated based on the second feature information to a preset size; and
acquire, using a third filter of the plurality of filters, third feature information representing the object from the resized second confidence map.

15. The electronic apparatus as claimed in claim 12, wherein the at least one processor is further configured to:
use the plurality of feature information acquired from the plurality of filters to respectively generate a plurality of confidence maps respectively corresponding to each of the plurality of filters;
acquire a first confidence map and a second confidence map among the generated plurality of confidence maps;
use the acquired first confidence map and the acquired second confidence map to generate a final confidence map; and
analyze the final confidence map to detect the object.

16. The electronic apparatus as claimed in claim 15, wherein:
the first confidence map is a map generated by using feature information acquired from a filter after a preset filter among the plurality of filters; and
the second confidence map is a map generated by using feature information acquired from a last filter of the plurality of filters.

17. The electronic apparatus as claimed in claim 15, wherein the at least one processor is further configured to adjust a size of at least one of the first confidence map and the second confidence map so as to be a same size.

18. The electronic apparatus as claimed in claim 15, wherein the at least one processor is further configured to detect the object according to whether a probability value representing a reliability of the object is greater than or equal to a preset threshold value from the final confidence map.

19. The electronic apparatus as claimed in claim 12, wherein the at least one processor is further configured to control the output device to output at least one of type information, positional information, and movement information of the detected object.

20. The electronic apparatus as claimed in claim 19, further comprising:
a communicator configured to communicate with another electronic apparatus to provide driving information,
wherein the at least one processor is further configured to control the communicator to transmit at least one of distance information from the object, dangerous situation information, and blind spot notification information to the other electronic apparatus using at least one of the type information, the positional information, and the movement information of the detected object.

21. The electronic apparatus as claimed in claim 12, wherein the electronic apparatus is included in a transportation apparatus, and the received video data is video data for a front area or a rear area of a road on which the transportation apparatus is driving.

22. A control method of an electronic apparatus, the control method comprising:
detecting an object included in received video data using feature information respectively acquired by at least two of a plurality of predetermined filters; and
wherein the detecting comprises:
generating a plurality of confidence maps respectively corresponding to the plurality of predetermined filters using a plurality of feature information, respectively;
acquiring a first confidence map and a second confidence map among the generated plurality of confidence maps;
generating a final confidence map using the acquired first confidence map and the acquired second confidence map; and
detecting the object by analyzing the final confidence map.

23. The control method as claimed in claim 22, wherein each of the plurality of feature information comprises a probability value representing a reliability of the object and positional information of the object.

24. The control method as claimed in claim 22, wherein:
the first confidence map is a map generated by using feature information acquired from a filter after a preset filter of the plurality of predetermined filters; and
the second confidence map is a map generated by using feature information acquired from a last filter of the plurality of predetermined filters.

25. The control method as claimed in claim 22, further comprising:
adjusting a size of at least one of the first confidence map and the second confidence map so as to be a same size.

26. The control method as claimed in claim 22, wherein the detecting the object by analyzing the final confidence map comprises detecting the object according to whether a probability value representing a reliability of the object is greater than or equal to a preset threshold value from the final confidence map.

27. A non-transitory computer-readable recording medium having recorded thereon a program executable by a computer for performing the control method of claim 22.

* * * * *